United States Patent
Feist et al.

(10) Patent No.: US 8,056,545 B2
(45) Date of Patent: Nov. 15, 2011

(54) INTEGRATED COVER AND EXHAUST GAS RECIRCULATION COOLER FOR INTERNAL COMBUSTION ENGINE

(75) Inventors: Larry Phillip Feist, Ypsilanti, MI (US); Patrick Brian Morgan, New Baltimore, MI (US)

(73) Assignee: Ford Global Technologies, Dearborn, MI (US)

( * ) Notice: Subject to any disclaimer, the term of this patent is extended or adjusted under 35 U.S.C. 154(b) by 395 days.

(21) Appl. No.: 12/349,220

(22) Filed: Jan. 6, 2009

(65) Prior Publication Data

US 2010/0170482 A1    Jul. 8, 2010

(51) Int. Cl.
*F02M 25/07* (2006.01)
*F02B 47/08* (2006.01)
*F02B 77/02* (2006.01)
*F01M 9/10* (2006.01)

(52) U.S. Cl. ............. 123/568.12; 123/90.38; 123/195 C
(58) Field of Classification Search ............. 123/568.11, 123/568.12, 90.38, 41.31, 195 C; 165/103; 60/605.2
See application file for complete search history.

(56) References Cited

U.S. PATENT DOCUMENTS

| 5,931,131 | A | * | 8/1999 | Hackett | 123/90.38 |
| 6,142,116 | A | | 11/2000 | Freese | |
| 6,213,074 | B1 | * | 4/2001 | Freese | 123/90.38 |
| 6,360,702 | B1 | * | 3/2002 | Osada | 123/41.31 |
| 6,708,677 | B2 | | 3/2004 | Brosseau et al. | |
| 7,182,074 | B1 | * | 2/2007 | Redon et al. | 123/568.12 |
| 7,185,642 | B1 | * | 3/2007 | Redon et al. | 123/568.12 |
| 7,343,907 | B2 | * | 3/2008 | Raab et al. | 123/568.12 |
| 7,516,737 | B2 | * | 4/2009 | Cerabone et al. | 123/568.12 |
| 2004/0079348 | A1 | | 4/2004 | Mori et al. | |
| 2004/0211400 | A1 | | 10/2004 | Basset | |
| 2007/0186899 | A1 | | 8/2007 | Nishimura et al. | |
| 2010/0083930 | A1 | * | 4/2010 | Clarke et al. | 123/195 C |

FOREIGN PATENT DOCUMENTS

JP    8-218941    8/1996

* cited by examiner

*Primary Examiner* — Willis Wolfe, Jr.
(74) *Attorney, Agent, or Firm* — Jerome R. Drouillard; Julia Voutyras

(57) ABSTRACT

An integrated engine cover and exhaust gas recirculation cooler for an internal combustion engine includes a cover for enclosing a portion of an engine and an EGR cooler having a housing formed as one piece with the cover. The EGR cooler includes at least one cooler section located within the housing and EGR and bypass valves for controlling the flow of exhaust gases either though the cooler or around the cooler.

11 Claims, 3 Drawing Sheets

INTEGRATED COVER AND EXHAUST GAS RECIRCULATION COOLER FOR INTERNAL COMBUSTION ENGINE

BACKGROUND OF THE INVENTION

1. Field of the Invention

The present invention relates to an internal combustion engine having cooled exhaust gas recirculation (herein after referred to as either "EGR" or exhaust gas recirculation).

2. Related Art

Exhaust gas recirculation has been used with automotive engines for many years. EGR cooling has also been used, but has proven to be difficult to package in modern, crowded engine compartments. Space and packaging problems arise because the cooler itself is ideally placed close by the engine so as to minimize pressure losses, and also to reduce the package volume itself. Usually, too, such coolers are separate components from the other major components of the engine and this increases the cost and complexity of EGR coolers. Finally, remotely mounted EGR coolers present the potential for coolant leaks.

It would be desirable to provide an EGR cooler which is integral with other major components of the engine and which reduces the number of parts required to build an engine, while occupying minimum package volume, or space, within an engine compartment.

SUMMARY OF THE INVENTION

According to an aspect of the present invention, an integrated cover and exhaust gas recirculation cooler for an internal combustion engine includes a cover for enclosing a portion of an engine and an EGR cooler including a housing formed as one piece with the cover. According to one aspect of the present invention, the cover preferably comprises a cylinder valve actuator cover attached to a cylinder head of an engine. The cover in this case may be a rocker arm cover or cylinder valve actuator cover.

According to another aspect of the present invention, an EGR cooler, which is integral with another major component of the engine, further includes a high temperature cooling section and a low temperature cooling section, with each of the cooling sections being located within a single EGR cooler housing.

According to another aspect of the present invention, a high temperature cooling section may be supplied with coolant flowing from a cylinder head of the engine, with the low temperature coolant being supplied by an external cooling system including a radiator.

According to another aspect of the present invention, an EGR cooler also includes an EGR valve for controlling a flow of exhaust gas to the EGR cooler, and a bypass valve located downstream from the EGR valve, for selectively allowing exhaust gases to flow to an engine combustion air intake without first passing through a cooling section of the EGR cooler.

As noted above, the high temperature cooling section may be supplied with coolant from a cylinder head; alternatively, the low temperature cooling section may be supplied with coolant flowing from a heat exchanger exposed to ambient air.

According to another aspect of the present invention, an internal combustion engine includes a cylinder block, at least one cylinder head attached to the cylinder block, and a combination, one-piece cylinder valve actuator cover and EGR cooler housing attached to the cylinder head.

It is an advantage of an integrated cover and exhaust gas recirculation cooler according to the present invention that the number of parts and pieces, including connectors, hoses, brackets and other such devices, required to build an engine, will be reduced in number, thereby reducing complexity and costs, while improving reliability.

It is another advantage of a system according to the present invention that dual stage cooling of EGR gases may be achieved by using both a higher temperature section and a lower temperature section in the EGR cooler.

It is yet another advantage of a system according to the present invention that the package volume required for an EGR cooler will be reduced, along with the cost of the EGR cooler.

Other advantages, as well as features of the present invention, will become apparent to the reader of this specification.

DETAILED DESCRIPTION OF THE PREFERRED EMBODIMENTS

Figure 1:
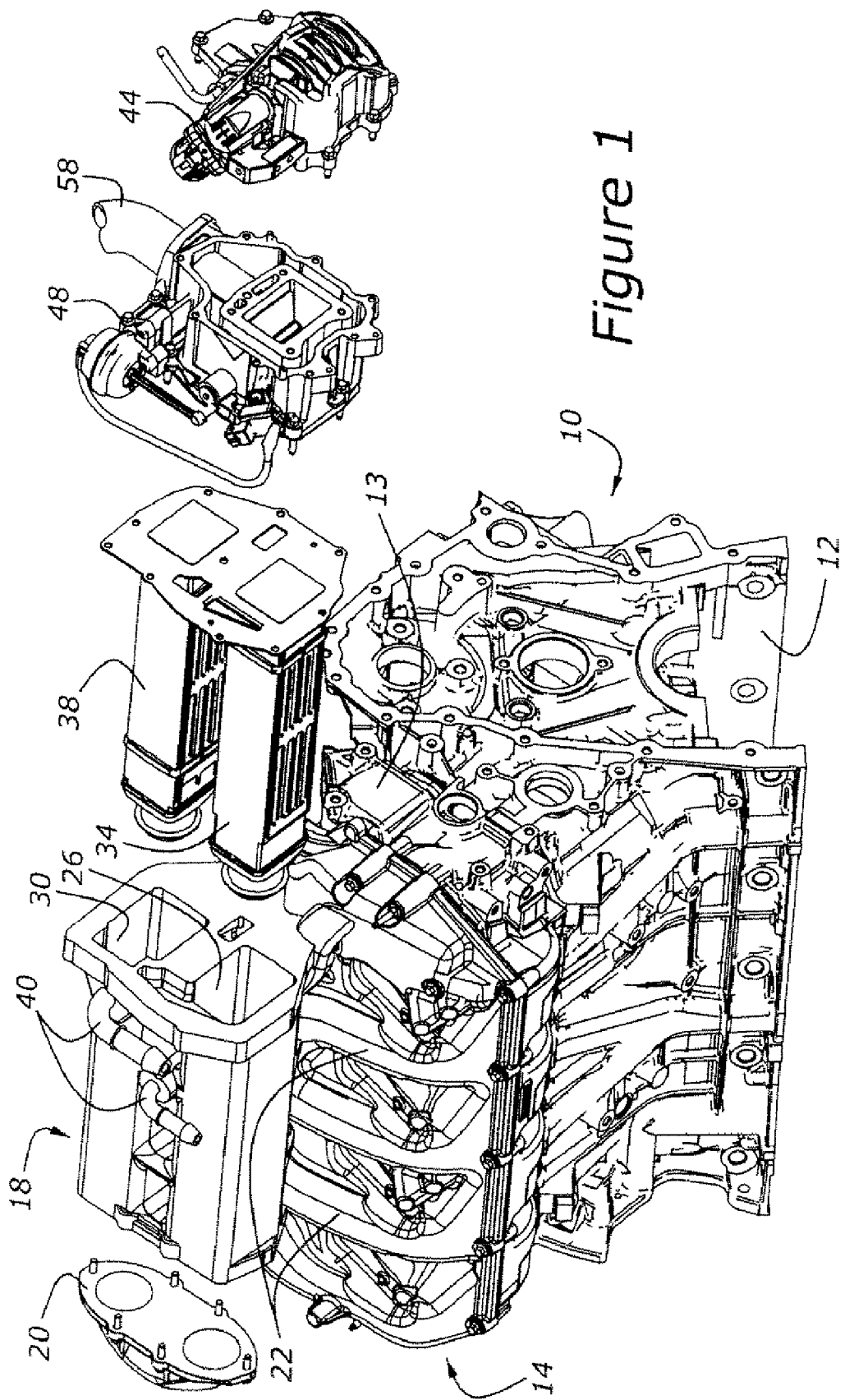
FIG. 1 is an exploded perspective view of an engine having an integrated cover and EGR cooler system according to the present invention
Figure 2:
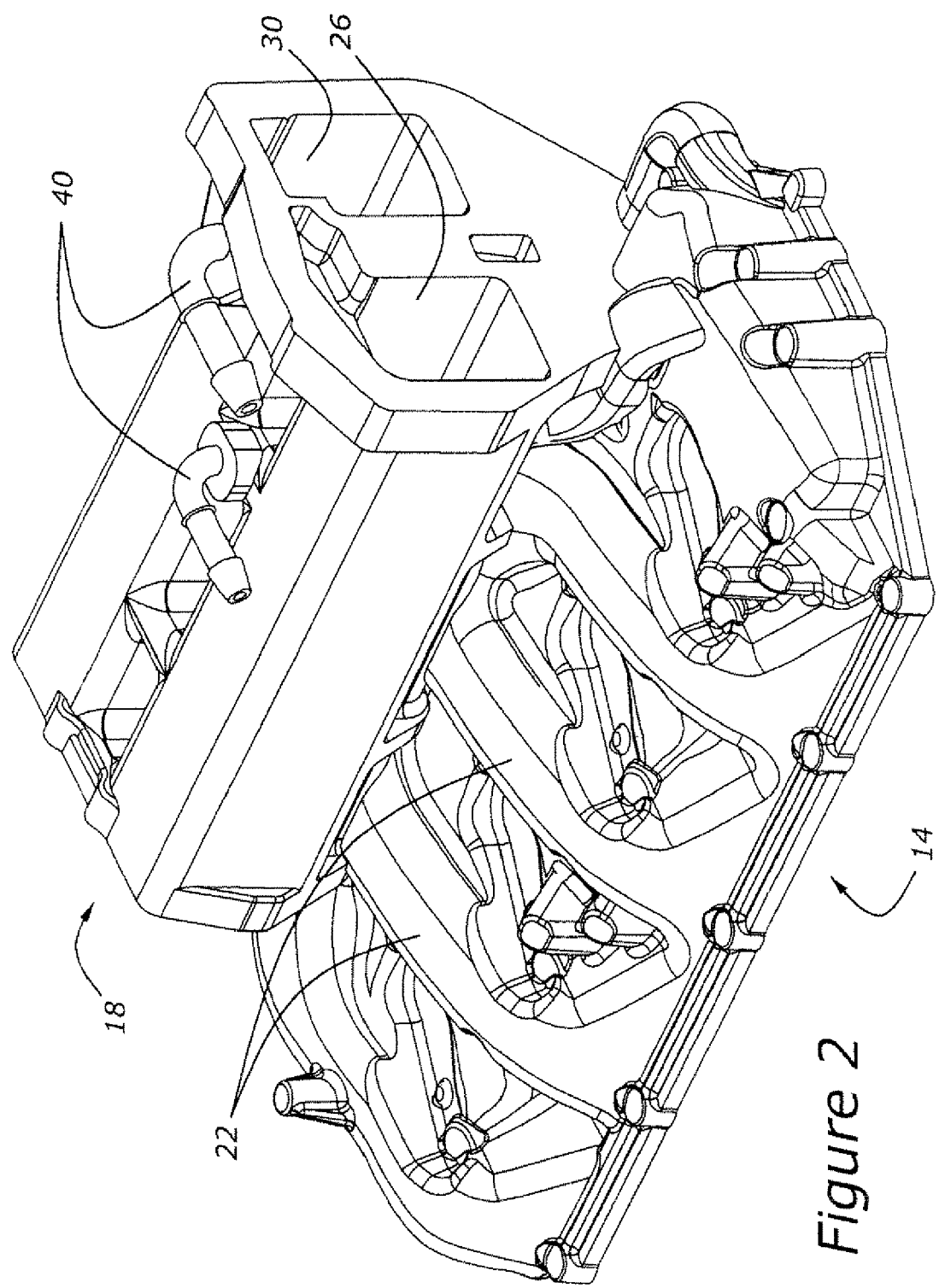
FIG. 2 is a perspective view of a portion of engine shown in FIG. 1, showing with particularity a combined rocker arm cover and intake manifold and EGR cooler.
Figure 3:
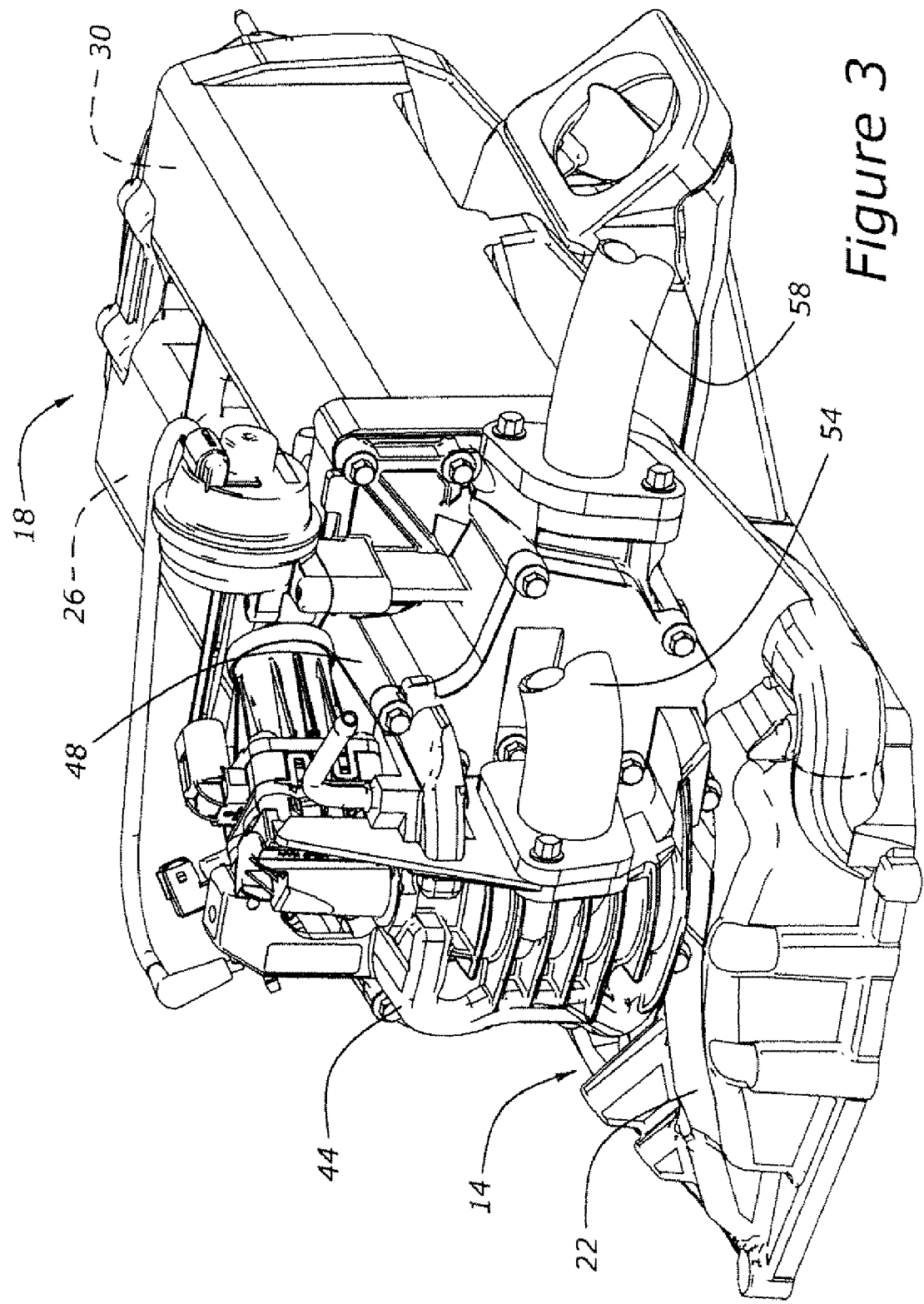
FIG. 3 is a perspective view showing an EGR cooler including an EGR valve and a bypass valve.

Referring to the Figures, wherein like numerals indicate like or corresponding parts throughout the several views, as shown in FIG. 1, an integrated cover and EGR cooler for an internal combustion engine 10, having a cylinder block 12 and a cylinder head 13, includes a cover, 14, having a number of lower intake runners 22 incorporated therein. In other words, cover 14 is not only a cover, such as a rocker arm or valve actuator cover, but also functions as an intake manifold having lower intake runners 22. Those skilled in the art will appreciate in view of this disclosure that cover 14 could take many forms, and not being necessary that lower intake runners 22 be incorporated therein.

Cover 14 is joined with and is one-piece with an EGR cooler housing, 18. Cooler housing 18 includes high temperature cooling section 26 and low temperature cooling section 30. A high temperature heat exchanger, 34, is slidably inserted into high temperature cooling section 26, and a low temperature heat exchanger 38 slidably inserted into low temperature cooling section 30.

Low temperature cooling section 30 is provided with two external coolant connectors, 40, which are connected with the engine's external cooling system, i.e. the radiator and heater plumbing. This is a typical source of lower temperature coolant for low temperature cooling section 30, including low temperature heat exchanger 38. In essence, recirculated exhaust gases flow through interior portions of high temperature heat exchanger 34 and low temperature heat exchanger 38; the exterior portions of these heat exchangers are bathed in coolant either at higher temperature or lower temperature.

High temperature cooling section 26 is furnished with higher temperature coolant directly from cylinder head 13, by means of cored or drilled passages (not shown) formed in part in cylinder head 13. Those skilled in the art are familiar with the art of cored passages for moving coolant around an engine. Additionally, those skilled in the art will appreciate in view of this disclosure that low temperature heat exchanger 38 may be supplied with liquid coolant from several alternative types of cooling systems, such as a system including a dedicated pump, reservoir, and heat exchanger.

The flow of exhaust gases through heat exchangers 34 and 38 is controlled by two valves. EGR valve 44, which receives exhaust gases from EGR supply tube 54, which is connected at the engine's exhaust system, meters the gross flow of recirculated gas passing through the EGR system and entering the engine's air intake through EGR outlet 58. EGR outlet 58 is attached to a bypass valve, 48, which is mounted between EGR valve 44 and EGR cooler housing 18. Exhaust gases entering EGR valve 44 from EGR supply tube 54 first flow through bypass valve 48. There, depending upon the needs of the engine, the exhaust gases will either be caused by valve 48 to flow into low temperature cooling section 30, and heat exchanger 38, or, if EGR cooling is not needed, the exhaust gases will be sent directly into EGR outlet 58, and then to the engine's combustion air intake.

Exhaust gases flowing first through low temperature heat exchanger 38 pass through transfer passage 20, which is mounted at an end portion of EGR cooler housing 18, where the exhaust gases flow from low temperature cooling section 30 to high temperature cooling section 26. Then, after flowing through high temperature cooling section 26, including high temperature heat exchanger 34, the EGR gases flow once again through bypass valve 48 and into EGR outlet 58.

The present arrangement is very beneficial for compression ignition ("diesel") engines, particularly turbocharged diesel engines running at very high rates of EGR required to comply with stringent fuel economy and emission regulations.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An integrated cover and exhaust gas recirculation cooler for an internal combustion engine, comprising:
   a cover for enclosing a portion of an engine; and
   an EGR cooler comprising a housing formed as generally one-piece with said cover, with said EGR cooler further comprising:
      at least one cooler section located within said housing, with said cooler section being furnished with a cooling medium;
      an EGR valve for controlling a flow of exhaust gas to said EGR cooler; and
      a bypass valve, located downstream from said EGR valve, for selectively allowing recirculated exhaust gas to flow to an engine combustion air intake without passing through said at least one cooler section.

2. An internal combustion engine, comprising:
   a cylinder block;
   at least one cylinder head attached to said cylinder block;
   a combination, one-piece cylinder valve actuator cover and EGR cooler housing attached to said at least one cylinder head;
   at least one cooler section located within said EGR cooler housing,
   a bypass valve, mounted upon said cooler housing, for selectively allowing recirculated exhaust gas to flow into the engine without first passing through said cooler section; and
   an EGR valve for controlling a flow of recirculated exhaust gas from said engine and through said bypass valve.

3. An internal combustion engine according to claim 2, wherein said engine comprises a compression ignition engine.

4. An internal combustion engine according to claim 2, wherein said engine comprises a turbocharged compression ignition engine.

5. An integrated cover and exhaust gas recirculation cooler for an internal combustion engine, comprising:
   a cover comprising a combination rocker arm cover and lower intake manifold attached to and enclosing a cylinder head of an engine; and
   an EGR cooler comprising a housing formed as one-piece with said cover.

6. An integrated cover and exhaust gas recirculation cooler according to claim 5, wherein said EGR cooler further comprises an EGR valve for controlling a flow of exhaust gas to said EGR cooler, and a bypass valve, located downstream from said EGR valve, for selectively allowing exhaust gases to flow to an engine combustion air intake without first passing through a cooling section of the EGR cooler.

7. An integrated cover and exhaust gas recirculation cooler according to claim 5, wherein said cover comprises a cylinder valve actuator cover attached to a cylinder head of an engine.

8. An integrated cover and exhaust gas recirculation cooler according to claim 7, wherein said cylinder valve actuator cover comprises a rocker arm cover.

9. An integrated cover and exhaust gas recirculation cooler according to claim 5, wherein said EGR cooler further comprises a high temperature cooling section and a low temperature cooling section, wherein both of said cooling sections are located within said housing.

10. An integrated cover and exhaust gas recirculation cooler according to claim 9, wherein said high temperature cooling section is supplied with coolant from a cylinder head of an engine, and said low temperature cooling section is supplied with coolant from an external cooling system.

11. An integrated cover and exhaust gas recirculation cooler according to claim 9, wherein said high temperature cooling section is supplied with coolant from the cylinder head and said low temperature cooling section is supplied with coolant, flowing from a heat exchanger exposed to ambient air.

* * * * *